US008442791B2

(12) United States Patent
Stählin

(10) Patent No.: US 8,442,791 B2
(45) Date of Patent: May 14, 2013

(54) CORRECTION OF A VEHICLE POSITION BY MEANS OF LANDMARKS

(75) Inventor: Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 493 days.

(21) Appl. No.: 12/674,508

(22) PCT Filed: Apr. 23, 2008

(86) PCT No.: PCT/EP2008/054938
§ 371 (c)(1),
(2), (4) Date: Feb. 22, 2010

(87) PCT Pub. No.: WO2009/030521
PCT Pub. Date: Mar. 12, 2009

(65) Prior Publication Data
US 2011/0161032 A1    Jun. 30, 2011

(30) Foreign Application Priority Data
Apr. 23, 2008   (DE) .......................... 10 2008 020 446

(51) Int. Cl.
*G01C 21/26* (2006.01)
*G01C 22/00* (2006.01)
*G06F 19/00* (2011.01)
*G06F 17/40* (2006.01)

(52) U.S. Cl.
USPC ........... 702/94; 73/1.79; 340/995.25; 701/26; 701/445; 701/467; 701/469; 701/495; 702/150; 708/200

(58) Field of Classification Search .......... 702/94, 702/1, 85, 127, 150, 187, 189; 73/1.01, 1.79, 73/865.8, 865.9; 340/944, 988, 995.1, 995.25; 356/600, 614; 382/100, 103, 108; 701/1, 701/23, 25, 26, 400, 408, 409, 445, 467, 701/468, 469, 484, 494, 495; 708/100, 105, 708/200; *G01C 21/00, 21/26, 22/00; G06F 11/00, G06F 11/30, 11/32, 17/00, 17/40, 19/00*
See application file for complete search history.

(56) References Cited

U.S. PATENT DOCUMENTS

| | | | | |
|---|---|---|---|---|
| 4,114,437 A | * | 9/1978 | Krogmann | 73/178 R |
| 4,774,671 A | * | 9/1988 | Itoh et al. | 701/447 |
| 4,774,672 A | * | 9/1988 | Tsunoda et al. | 701/447 |
| 5,334,986 A | * | 8/1994 | Fernhout | 342/357.31 |
| 5,852,791 A | * | 12/1998 | Sato et al. | 701/446 |
| 6,047,234 A | * | 4/2000 | Cherveny et al. | 701/451 |
| 6,272,405 B1 | * | 8/2001 | Kubota | 701/23 |
| 6,516,267 B1 | * | 2/2003 | Cherveny et al. | 701/409 |

(Continued)

FOREIGN PATENT DOCUMENTS

| | | |
|---|---|---|
| DE | 195 05 487 A1 | 9/1995 |
| EP | 0 565 191 A2 | 10/1993 |

(Continued)

*Primary Examiner* — Edward Cosimano
(74) *Attorney, Agent, or Firm* — RatnerPrestia

(57) ABSTRACT

A position for a vehicle is corrected by detecting landmarks on the journey route and correcting the measured vehicle position when a landmark of this kind has been identified. The landmarks are stored in a database in the vehicle with associated exact GPS positions. When a landmark is reached, the associated exact GPS position is compared with the position measured in the vehicle, whereupon the measured position is corrected. In this way, the position finding can be improved.

9 Claims, 2 Drawing Sheets

U.S. PATENT DOCUMENTS

| | | | |
|---|---|---|---|
| 6,853,913 B2 * | 2/2005 | Cherveny et al. | 701/461 |
| 8,140,266 B2 * | 3/2012 | Nakamura et al. | 701/495 |
| 2003/0125871 A1 * | 7/2003 | Cherveny et al. | 701/208 |
| 2005/0149259 A1 * | 7/2005 | Cherveny et al. | 701/208 |
| 2010/0082238 A1 * | 4/2010 | Nakamura et al. | 701/208 |
| 2010/0169013 A1 * | 7/2010 | Nakamura et al. | 701/213 |

FOREIGN PATENT DOCUMENTS

| | | | |
|---|---|---|---|
| JP | 63-113310 A | * | 5/1988 |
| JP | 09-072747 A | * | 3/1997 |
| JP | 2006-153714 | * | 6/2006 |
| JP | 2007-316025 | * | 12/2007 |

* cited by examiner

CORRECTION OF A VEHICLE POSITION BY MEANS OF LANDMARKS

CROSS REFERENCE TO RELATED APPLICATIONS

This application is the U.S. national phase application of PCT International Application No. PCT/EP2008/054938, filed Apr. 23, 2008, which claims priority to German Application No. 10 2007 041 047.8, filed Aug. 29, 2007 and German Patent Application No. 10 2008 020 446.3, filed Apr. 23, 2008, the contents of such applications being incorporated by reference herein.

FIELD OF THE INVENTION

The invention relates to navigation and safety engineering for vehicles. In particular, the invention relates to a correction apparatus for correcting a position for a vehicle, a correction system, the use of a correction apparatus in a vehicle, a method, a computer program product and a computer-readable medium.

BACKGROUND OF THE INVENTION

For many tasks, such as navigation, junction assistance or other driver assistance systems, the position accuracy of GPS (Global Positioning System) and probably also of the future Galileo system is often inadequate in complex traffic situations such as may arise at interchanges or multilane junctions, for example, since it is not possible to identify with sufficient accuracy the lane in which a vehicle is currently situated.

In addition, GPS reception is normally not possible in tunnels or garages, for example. For that reason, position finding resorts to wheel speed sensors, for example, in this case. However, this positioning is worse the more dynamic and the longer the journey without direct GPS reception.

SUMMARY OF THE INVENTION

It is an object of the invention to provide improved position finding for vehicles.

The invention specifies a correction apparatus, a correction system, a use, a method, a computer program product and a computer-readable medium.

The exemplary embodiments described relate in equal measure to the correction apparatus, the correction system, the use, the method, the computer program product and the computer-readable medium.

In line with one exemplary embodiment of the invention, a correction apparatus for correcting a position for a vehicle is specified which has a memory unit for storing data which correspond to a landmark on a journey route of the vehicle and which is designed to store an accurate first position for the landmark. In addition, a detection unit for detecting the landmark on the journey route and also a correction unit for correcting a measured second position for the vehicle on the basis of the accurate first position of the landmark are provided.

In other words, the correction apparatus may store a digital map which also contains information about a multiplicity of landmarks along the journey routes of the vehicle. By way of example, these may be significant bumps on the roadway or visually discernible features. The digital map data and the data regarding the landmarks may also be stored in different files and, by way of example, on different storage media. In this way, it is possible to prevent the digital map data from having to be changed when the data concerning the landmarks are changed.

While the vehicle is moving, the vehicle sensor system performs measurements. When a landmark on the journey route is detected during such measurement, it is possible to determine the landmark which is involved (through comparison with the data on the digital map and/or through comparison with the separately stored data concerning the landmarks). Following explicit identification of the landmark, the position of which is known with accuracy, of course, the measured vehicle position is corrected.

In this way, it is possible for the measured position to be corrected for every landmark along the journey route. This allows an improvement in the position finding without this requiring GPS reception.

In line with a further exemplary embodiment of the invention, the correction apparatus has a position-finding unit for measuring the second position of the vehicle.

Thus, in addition or as an alternative to position finding by means of ESP or similar sensor systems, the second position of the vehicle is measured using a position-finding unit.

In line with a further exemplary embodiment of the invention, the position-finding unit is designed to measure the second position using GPS, for which purpose it has a GPS receiver.

In line with a further exemplary embodiment of the invention, the position-finding unit is designed to measure the second position on the basis of a model of driving dynamics. By way of example, this model of driving dynamics resorts to measurement data from the electronic stability program (ESP) and from other vehicle sensor systems, such as an odometer or steering wheel angle sensor. In this way, the position finding is independent of satellite reception.

In line with a further exemplary embodiment of the invention, the detection unit has at least one sensor selected from the group comprising ESP sensor and camera.

In this way, it is possible to detect bumps in the roadway or particular markers at the edge of the roadway, for example.

In line with a further exemplary embodiment of the invention, the correction apparatus also has a communication unit for receiving update data which correspond to the landmarks.

In this way, the vehicle can be immediately informed when a landmark changes. The volume of data to be transmitted in this context is comparatively small. By way of example, the update data can be transmitted from a control center or else from another vehicle by means of vehicle-to-vehicle communication.

To avoid the risk of misuse, this is done using encryption techniques which allow the respective transmitter to be accurately identified.

In line with a further exemplary embodiment of the invention, a correction system for correcting a position for a vehicle is specified which has a correction apparatus as described above and a control center with a communication unit for sending the update data to the correction apparatus.

By way of example, the control center may be a traffic control system with a central server which is capable of supplying a multiplicity of vehicles with individual update data. The term "individual update data" is intended to be understood to mean that every single vehicle can determine when, to what extent and in what area relative to the vehicle it would like to receive update data from the central system. In this way, the data traffic can be reduced.

The term "digital maps" is also intended to be understood to mean maps for advanced driver assistance systems (ADASs), without any navigation taking place.

The wireless transmission or the wireless reception of the update data is effected by GSM, UMTS, WEAN (e.g. 802.11p) or else by WiMax, for example. It is also possible to use other transmission protocols. The stated protocols afford the advantage of standardization already having taken place.

By way of example, the vehicle is a motor vehicle, such as a car, bus or heavy goods vehicle, or else is a rail vehicle, a ship, an aircraft, such as a helicopter or airplane, or, by way of example, a bicycle.

In line with a further exemplary embodiment of the invention, the use of a correction apparatus as described above in a vehicle is specified.

In line with a further exemplary embodiment of the invention, a method for correcting a position for a vehicle is specified which involves the storage of data which correspond to a landmark on a journey route of the vehicle. In addition, an accurate first position for the landmark is stored. In addition, the landmark is detected on the journey route and a measured second position for the vehicle is corrected on the basis of the accurate first position of the landmark.

In line with a further exemplary embodiment of the invention, a computer program product is specified which, when executed on a processor, instructs the processor to perform the method steps specified above.

In line with a further exemplary embodiment of the invention, a computer-readable medium is specified which stores a computer program product which, when executed on a processor, instructs the processor to perform the method steps specified above.

A fundamental consideration of the invention can be seen in that the position of a vehicle is corrected or actually first measured by detecting landmarks on the journey route of the vehicle. Following the identification of such a landmark, it is possible to correct or determine for the first time the position of the vehicle using position data which correspond to said landmark.

In this way, the position finding for the vehicle can be improved. Satellite reception is not an absolute necessity for this.

BRIEF DESCRIPTION OF THE DRAWINGS

The invention is best understood from the following detailed description when read in connection with the accompanying drawings. Included in the drawings is the following figures.

Figure 1:
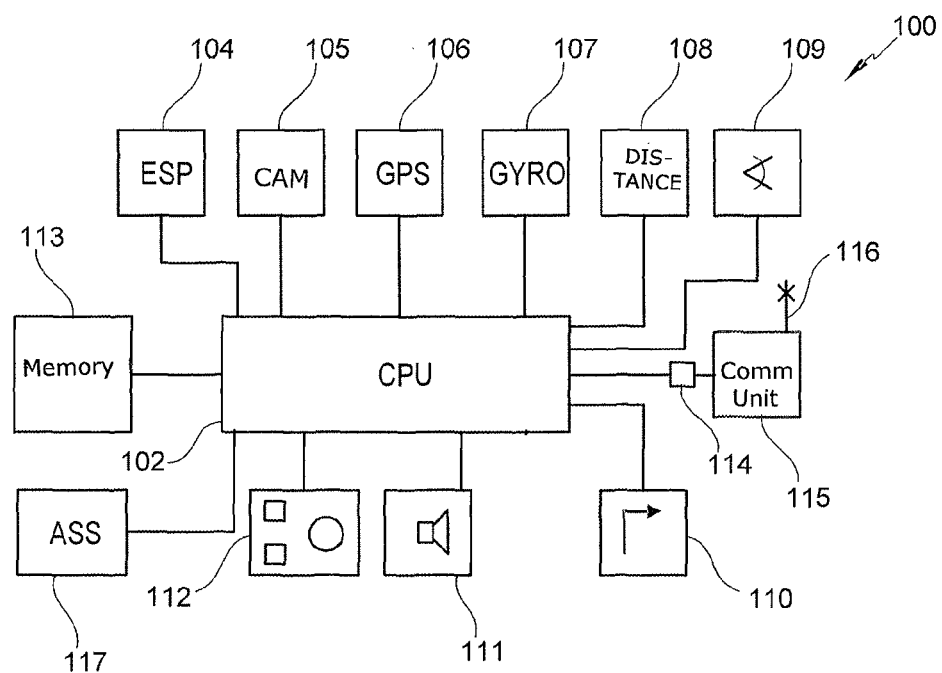
FIG. 1 shows a schematic illustration of a correction apparatus based on an exemplary embodiment of the invention.

The illustrations in the figures are schematic and not to scale.

DETAILED DESCRIPTION OF THE PREFERRED EMBODIMENTS

In the description of the figures which follows, the same reference numerals are used for the same or similar elements.

FIG. 1 shows a schematic illustration of a correction apparatus for correcting a position for a vehicle with its various components. By way of example, the correction apparatus 100 is installed in the vehicle and is designed firstly to correct a measured position for the vehicle and secondly also to initially determine a vehicle position. The correction apparatus 100 has a correction unit 102 as a central element in the form of a microprocessor. In addition, a communication unit 115 having an antenna 116 for communication with a control center or with other vehicles is provided. To ensure data integrity and to prevent possible misuse, an encryption unit 114 is provided which is connected between the correction unit 102 and the communication unit 115, 116 and is designed to encrypt and decrypt data which are sent and received.

In addition, a memory unit 113 for storing data which correspond to a landmark on a journey route of the vehicle and for storing an accurate first position for the landmark is provided.

The correction or control unit 102, for example in the form of a CPU, has an input unit 112 connected to it. The input unit 112 can be used to make various adjustments to the correction apparatus and to choose a destination and possibly also a location for a navigation unit, for example. In this case, it is possible to input the destination by inputting the full name of the destination or else by selecting from a list which is shown on a visual output unit, such as a monitor 110.

The monitor 110 is also used to output the routing information. Furthermore, the routing information can also be output via an audible output unit 111. Output via an audible output unit 111 has the advantage that the driver is less distracted from what is currently happening in the traffic. The memory element 113, which is connected to the central correction unit 102 or is integrated in the correction unit 102, stores the map data (navigation map data) and the data concerning the landmarks in the form of data records. By way of example, the memory element 113 also stores additional information about traffic restrictions and the like in association with the data records.

The central controller with the correction unit 102 may have a driver assistance system 117 connected to it which is used to assist the driver.

For the purpose of determining the current vehicle position, the correction apparatus 100 has a navigation unit or position-finding unit, which is integrated in the central controller 102, for example, and a GPS receiver 106 which is designed to receive navigation signals from GPS satellites. Naturally, the navigation unit with the GPS receiver 106 may also be designed for other satellite navigation systems, such as Galileo.

However, since the GPS signals cannot always be received in city centers, for example, the correction apparatus 100 also has a detection unit with a direction sensor 107, a distance sensor 108, possibly a steering wheel angle sensor 109, and also has an ESP sensor system 104 and a visual detector, such as a camera 105, for the purpose of performing compound navigation and for the purpose of determining the vehicle position.

The signals from the GPS receiver and from the other sensors are handled in the correction unit 102, for example. The vehicle position ascertained from said signals is compared with the position of a landmark on the journey route after such a landmark has been identified. When the vehicle position has been corrected, the routing information obtained in this manner can be output via the monitor 110.

In other words, a database in the vehicle (e.g. a digital map) stores landmarks together with their exact GPS position. As soon as the vehicle reaches these points, the GPS position can be corrected with the stored position. When GPS reception is available, said correction provides for an improvement in the accuracy of the positioning in similar fashion to a differential GPS. If there is no GPS reception, the accuracy of the position update is significantly improved. In this case, the landmarks must be explicitly identifiable using onboard (ESP) sensor systems or cameras.

For example, the landmarks may be ramps, traffic lights, severe bumps in an otherwise flat road, cants, road signs, manhole covers, the start or end of sections of loose gravel, the start or end of paved road sections, rails crossing the road and the like.

In this case, the stored data can also be transmitted locally, e.g. by radio. It is thus possible to adapt to changing circumstances. The transmission of the stored data in the form of update data can be effected by adjacent vehicles or else by a traffic control center.

Using the landmarks, it is also possible, to a restricted degree, to perform position finding entirely without a GPS receiver. To this end, the position is found between the landmarks using a model of driving dynamics or a plurality of models of driving dynamics.

In one embodiment, GPS is corrected using Differential GPS, which requires GPS reception, however. If no GPS signal is available, an ESP sensor system can be used to calculate the GPS position in models of driving dynamics.

The landmarks can also be used to correct the GPS position on long journeys without signal reception. In addition, the accuracy can be improved without this requiring new infrastructure, as is the case with Differential GPS as a result of the additionally required transmitter. The use of landmarks means that no additional sensor system is required in the vehicle.

Figure 2:
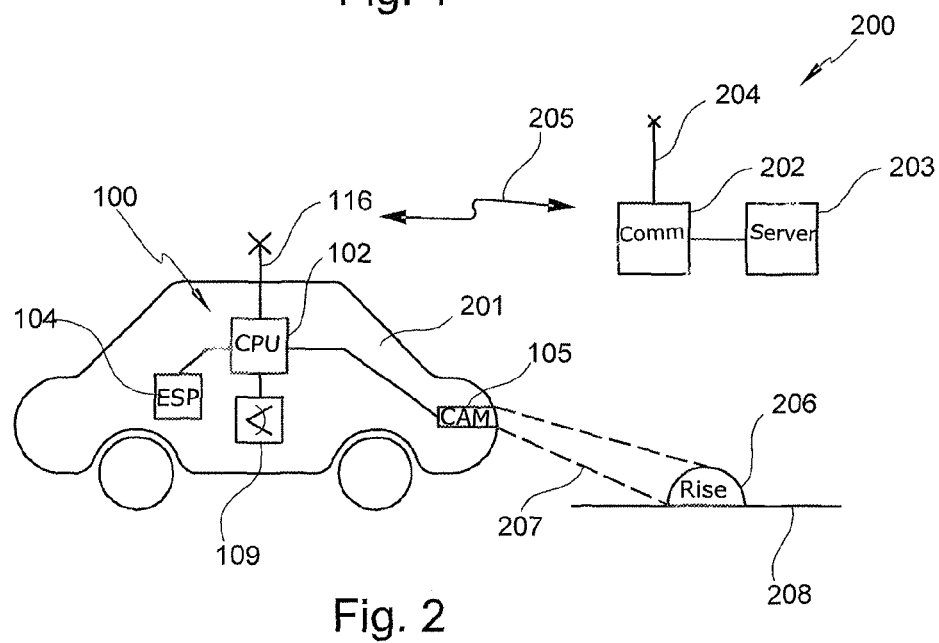
FIG. 2 shows a schematic illustration of an overall system for position correction based on an exemplary embodiment of the invention.

FIG. 2 shows a schematic illustration of an overall system which has a correction apparatus 100, integrated in a vehicle 201, and a control center 200. The correction apparatus 100 has not only the communication device with antenna 116 and the central controller or correction unit 102 but also a complete vehicle sensor system. In this case, the vehicle sensor system comprises an ESP sensor system 104, a camera system 105 and a steering wheel angle sensor 109.

The camera system 105 can be used to detect features of the journey route 208. For this, the camera system 105 uses a detection beam 207 to scan the environment. When a landmark, such as a rise 206 at the roadside or on the roadway, is detected, an appropriate detection signal is transferred from the camera system 105 to the controller 102. The controller 102 then performs appropriate analysis of the detection signal. This analysis may possibly also involve the use of further measured values, for example from the ESP sensor system 104. By way of example, the ESP sensor system 104 can detect whether this is really a bump on the roadway.

By way of example, the digital map stores the fact that the start of a multistory parking lot ramp is located at the position (0/0). The vehicle identifies the slope of the multistory parking lot ramp using an ESP sensor system and corrects the internal position to the value (0/0).

The control center 200 has a communication device 202 with an antenna 204 and a central server 203. From the control center, update data can be transmitted to the individual vehicles via the communication path 205. Similarly, the individual vehicles can transmit measurement data to the control center 200, which can then be used to communicate said new data to other vehicles.

Figure 3:
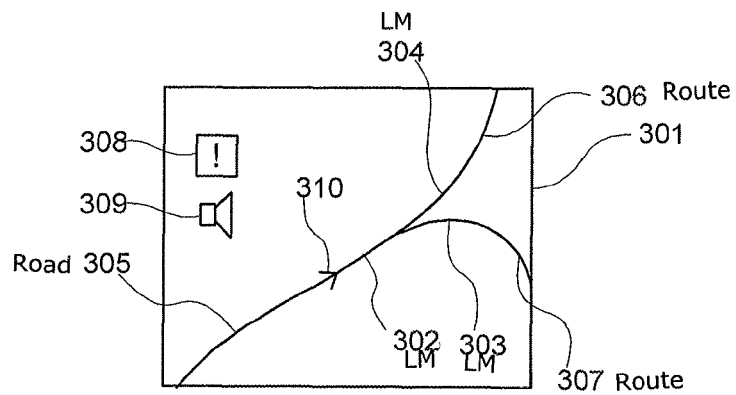
FIG. 3 shows a schematic illustration of a detail from a digital navigation map based on an exemplary embodiment of the invention.

FIG. 3 shows a schematic illustration of a detail 301 from a digital map. A road 305 can be seen which forks into two arms 306, 307. The vehicle 310 is approaching the fork from a southwesterly direction. As soon as it crosses the point 302, the vehicle sensor system detects what is known as a "landmark", which is a bump with a characteristic form on the roadway, for example. Following analysis of the detected data, the position of the vehicle can be stipulated with a high level of accuracy. If a second landmark 303 is then subsequently detected (for example a sharp bend), the vehicle recognizes that the route 307 has been chosen. If, on the other hand, another landmark 304 is detected, which is an underpass, for example, then the vehicle recognizes that the route 306 has been chosen.

The relevant information can be output visually in the field 308 or else audibly (symbolized by reference symbol 309), for example.

Figure 4:
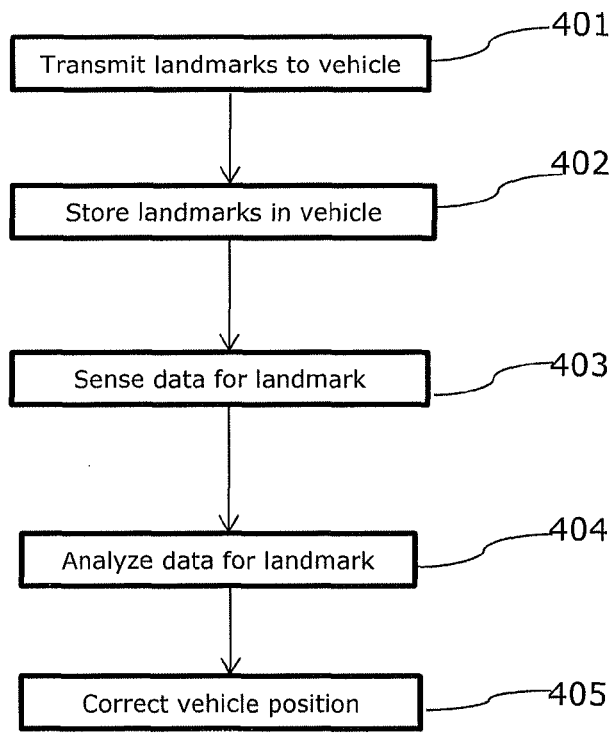
FIG. 4 shows a flowchart for a method based on an exemplary embodiment of the invention.

FIG. 4 shows a flowchart for a method based on an exemplary embodiment of the invention. In step 401, the correction apparatus communicates with the control center. In this case, the control center transmits update data for the landmarks. In step 402, the landmarks, including the GPS positions, are stored in the vehicle. These points can be updated by radio, for example, if appropriate locally, at regular intervals or intervals chosen by the driver himself.

In step 403, a landmark of this kind is recognized by means of a sensor system (for example an ESP sensor system) which is already present or a camera. There may also be a multiplicity of cameras provided which have different sensitivities and viewing directions. At the same time, the GPS position of the vehicle is detected. In step 404, the data detected by the sensor system is analyzed. If appropriate, filter functions are provided for this purpose in order to prevent mismeasurements from being linked to a landmark. In areas without GPS reception or if the GPS appliance is switched off, the vehicle position is corrected on the basis of the landmarks (step 405). In this way, it is possible to improve the GPS accuracy. In addition, this allows the GPS position to be found without a GPS receiver.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

What is claimed:

1. A correction apparatus for correcting a position for a vehicle on a roadway, said correction apparatus comprising:
   a memory unit for storing data which correspond to a landmark on a journey route of the vehicle and for storing an accurate first position for the landmark;
   a detection unit having an electronic stability program (ESP) sensor for detecting the landmark on the journey route; and
   a correction unit for correcting a measured second position for the vehicle on the basis of the accurate first position of the landmark,
   wherein the landmark is a roadway condition of the roadway.

2. The correction apparatus as claimed in claim 1, wherein the detection unit includes a camera for detecting the landmark on the journey route.

3. The correction apparatus as claimed in claim 1 further comprising:
   a communication unit for receiving update data which correspond to the landmarks.

4. The correction apparatus as claimed in claim 3, wherein the communication unit receives the update data from a control center.

5. The correction apparatus as claimed in claim 1 further comprising:

a position-finding unit for measuring the second position of the vehicle.

6. The correction apparatus as claimed in claim 5, wherein the position-finding unit has a GPS receiver for measuring the second position.

7. The correction apparatus as claimed in claim 5, wherein the position-finding unit is configured to measure the second position on the basis of a model of driving dynamics.

8. A method for correcting a position for a vehicle on a roadway, said method comprising the following steps:
   storing, by a processor, data which correspond to a landmark on a journey route of the vehicle and an accurate first position for the landmark;
   detecting, by an electronic stability program (ESP) sensor, the landmark on the journey route; and
   correcting, by the processor, a measured second position for the vehicle on the basis of the accurate first position of the landmark,
   wherein the landmark is a roadway condition of the roadway.

9. A non-transitory computer-readable medium which stores a computer program product which, when executed on a processor, instructs the processor to perform the following steps:
   storing data which correspond to a landmark on a journey route of the vehicle traveling on a roadway, and an accurate first position for the landmark;
   detecting, by an electronic stability program (ESP), the landmark on the journey route; and
   correcting a measured second position for the vehicle on the basis of the accurate first position of the landmark,
   wherein the landmark is a roadway condition of the roadway.

* * * * *